US012353679B2

(12) United States Patent
Fardig et al.

(10) Patent No.: US 12,353,679 B2
(45) Date of Patent: Jul. 8, 2025

(54) COMPUTER VISION TO DEPICT USER INPUT TO ONE DEVICE AT ANOTHER DEVICE

(71) Applicant: Lenovo (Singapore) Pte. Ltd., Singapore (SG)

(72) Inventors: Matthew Fardig, Morrisville, NC (US); Leana Neparidze, Morrisville, NC (US); Timothy Robbins, Morrisville, NC (US); Lindsay Nelson, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 226 days.

(21) Appl. No.: 18/152,691

(22) Filed: Jan. 10, 2023

(65) Prior Publication Data
US 2024/0231564 A1    Jul. 11, 2024

(51) Int. Cl.
| | | |
|---|---|---|
| *G06F 3/0482* | (2013.01) | |
| *G06F 3/0487* | (2013.01) | |
| *G06F 3/14* | (2006.01) | |
| *H04L 65/1089* | (2022.01) | |
| *H04L 65/613* | (2022.01) | |

(52) U.S. Cl.
CPC .......... *G06F 3/0482* (2013.01); *G06F 3/0487* (2013.01); *G06F 3/1462* (2013.01); *H04L 65/1089* (2013.01); *H04L 65/613* (2022.05)

(58) Field of Classification Search
CPC . H04L 65/403; H04L 65/613; H04L 65/1089; G06F 3/0482; G06F 3/0487; G06F 3/1462
See application file for complete search history.

(56) References Cited

U.S. PATENT DOCUMENTS

| | | | | |
|---|---|---|---|---|
| 2011/0289401 A1* | 11/2011 | Fischer | ................. | G06F 40/103 |
| | | | | 715/232 |
| 2016/0353057 A1* | 12/2016 | Chung | ................. | H04L 65/403 |
| 2017/0017632 A1* | 1/2017 | York | ....................... | H04L 12/18 |
| 2021/0349430 A1* | 11/2021 | Munteanu | ................. | G06F 8/34 |
| 2022/0253807 A1* | 8/2022 | Woodard | ............. | G06Q 10/103 |

* cited by examiner

*Primary Examiner* — Andrew T Chiusano
(74) *Attorney, Agent, or Firm* — John M. Rogitz; John L. Rogitz

(57) ABSTRACT

In one aspect, a first device includes a processor and storage. The storage includes instructions executable by the processor to present video at the first device, where the video is generated at a second device. The instructions are also executable to determine identifying information for a first graphical object selected at the second device, where the first graphical object is related to the video. Based on the identifying information, the instructions are executable to execute computer vision to identify a second graphical object that matches the first graphical object to at least a threshold level of confidence. The second graphical object is presented on a display of the first device. Based on identification of the second graphical object, the instructions are executable to depict, on the display via the second graphical object, the selection at the second device of the first graphical object.

20 Claims, 9 Drawing Sheets

COMPUTER VISION TO DEPICT USER INPUT TO ONE DEVICE AT ANOTHER DEVICE

FIELD

The disclosure below relates to technically inventive, non-routine solutions that are necessarily rooted in computer technology and that produce concrete technical improvements. In particular, the disclosure below relates to computer vision to depict user input to one device at another device.

BACKGROUND

In today's distributed computing environment, two people might be video conferencing while performing actions on their respective computers. As recognized herein, if one user is seeking to mimic what the other user is doing, the other user's screen might be shared as part of the video conference. However, as further recognized herein, oftentimes whatever object the other user is interacting with as shown in the screen share is not located at the same display position on the mimicking user's own device, which can lead to disjointed video conferencing and confusion as to how to properly operate the mimicking user's computer. There are currently no adequate solutions to the foregoing computer-related, technological problem.

SUMMARY

Accordingly, in one aspect a first device includes at least one processor and storage accessible to the at least one processor. The storage includes instructions executable by the at least one processor to present video at the first device, where the video is generated at a second device different from the first device. The instructions are also executable to determine identifying information for a first graphical object selected at the second device, where the first graphical object is related to the video. Based on the identifying information, the instructions are executable to execute computer vision to identify a second graphical object that matches the first graphical object to at least a threshold level of confidence, where the second graphical object is presented on a display of the first device. Based on identification of the second graphical object, the instructions are executable to depict, on the display via the second graphical object, the selection at the second device of the first graphical object.

Accordingly, in some examples depicting the selection of the first graphical object may include reproducing, on the display via the second graphical object, an annotation made at the second device in relation to the first graphical object. Thus, if desired the instructions may be executable to receive, from the second device, data indicating the annotation made at the second device in relation to the first graphical object.

Also in various example implementations, the first and second graphical objects may be presented at different relative display locations at the second and first devices.

Still further, in some examples the instructions may be executable to present the video at the first device as part of a currently-transpiring video conference and depict, via the video, the selection at the second device of the first graphical object. In other examples, the instructions may be executable to present the video at the first device as recorded via the second device prior to presentation of the video at the first device.

Also in various examples, the identifying information may be determined based on receipt of the identifying information from a device other than the first device. For example, the identifying information may be generated based on execution of computer vision at the second device and/or a server in communication with the second device.

Additionally, in some specific examples the first and second graphical objects may be selectors that are associated with a same software application versions of which are stored at the first and second devices. Additionally or alternatively, the first and second graphical objects may include text respectively presented at the second and first devices.

Also in some specific examples, the first device may include the display itself.

In another aspect, a method includes determining, at a first device, identifying information for a first graphical object selected at a second device different from the first device. Based on the identifying information, the method includes using computer vision to identify a second graphical object that matches the first graphical object to at least a threshold level of confidence, where the second graphical object is presented on a display of the first device. Based on identifying the second graphical object using computer vision, the method includes depicting, on the display via the second graphical object, the selection at the second device of the first graphical object.

In some examples, the method may also include presenting video at the first device, the video generated at the second device and being related to selection at the second device of the first graphical object.

Also in some examples, depicting the selection of the first graphical object may include reproducing, on the display, an annotation made at the second device in relation to the first graphical object. The annotation may include a circling of the first graphical object, an underlining of the first graphical object, and/or a drawing of an arrow pointing toward the first graphical object.

Also if desired, the identifying information may be determined based on receipt of the identifying information as generated based on execution of computer vision at the second device. Here the identifying information may be received from the second device and/or a server in communication with the second device.

Still further, in certain example implementations the first and second graphical objects may be icons presented at different relative display locations at the second and first devices.

Also in certain example implementations, the method may include determining, at the first device, the identifying information based on execution of computer vision at the first device using video from the second device.

Still further, in some specific examples depicting the selection of the first graphical object may include depicting a mouse click on the second graphical object.

In still another aspect, at least one computer readable storage medium (CRSM) that is not a transitory signal includes instructions executable by at least one processor to generate video via a first device and identify, while the video is being generated, user input to the first device. The instructions are also executable to execute computer vision to determine identifying information for a first graphical object that is presented at the first device and to which the user input is directed. The instructions are also executable to determine user input information that is usable to visually demonstrate, on a display, the user input. The instructions are then executable to transmit the video, the identifying information, and the user input information to a second device different from the first device.

In some specific example embodiments, the instructions may be executable to generate an event stream indicating the identifying information and the user input information. In these embodiments, the instructions may then be executable to transmit the video to the second device as a first discrete stream and to transmit the event stream to the second device as a second discrete stream.

The details of present principles, both as to their structure and operation, can best be understood in reference to the accompanying drawings, in which like reference numerals refer to like parts, and in which:

DETAILED DESCRIPTION

Figure 1:
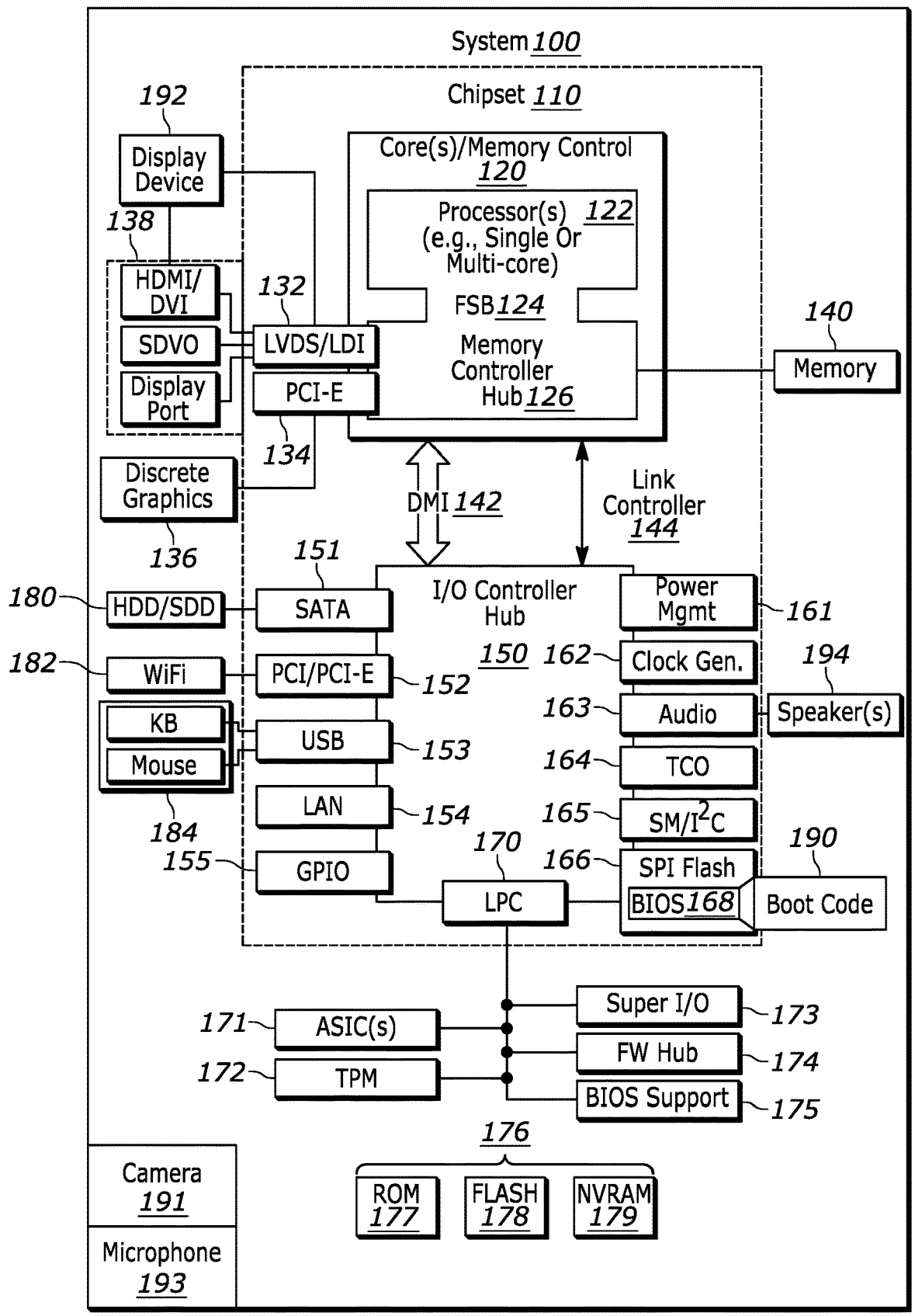
FIG. 1 is a block diagram of an example system consistent with present principles.

As recognized herein, digital annotations during a video conference allow the presenter as well as viewers of the presentation to draw on a shared screen. This may be useful for identifying the location of things such as icons, menu items, important portions of documents, etc., and can be used in collaboration sessions. The disclosure below provides devices and methods where such annotations are not limited to only allowing drawing on the actual "screen" that is shared. This is because if the presenter is giving instructions to users about how to accomplish a task, it is possible that the presenter's screen looks very different than the viewer screens. For example, icons might be in different locations on different screens, users might be using different operating systems, menu options within applications might be in different orders if users have different versions of the same application, etc.

Thus, annotations that are not locked to the presenter's screen share according to the technical aspects below may be used to improve video conferencing as it can be more useful to highlight things on the viewer's own screen once the annotated item is identified on the viewer screen itself. For example, suppose a presenter circles a Microsoft Word icon on their own screen where it is located down in the toolbar at the bottom of the screen. Viewers would be able to see exactly where that icon is on the presenter screen but, absent present principles, would have to look for it on their own screen. That icon might be in the bottom toolbar on Viewer 1's screen, but it might be located to the far left rather than the far right. On Viewer 2's screen, the icon might be located in the upper right portion of their desktop rather than in the toolbar. On Viewer 3's screen, there might not even be a toolbar at the bottom and the icon might be located at the bottom right of their desktop. In situations like this, viewers do not have to search for the annotated item on their own screen owing to present principles.

Accordingly, in one aspect client devices configured to operate consistent with present principles may identify what is being annotated on a presenter screen using computer vision technology and then mirror the annotation at a matching object but as presented at a given location on the viewer's own screen. For example, as indicated above the presenter might circle the Microsoft Word icon on their own touch-enabled screen using a stylus, finger, or mouse cursor, and computer vision may then be executed to determine that a blue rectangle containing a white letter W was circled on the presenter's screen. That information may then be sent to every attendee of the video conference, and computer vision may then be executed locally at each attendee's own device to locate a blue rectangle with a white letter W on each individual attendee's own screen that matches. The attendee's device may then apply the same annotation circle around the attendee's matching Word icon (e.g., even if the W is found at a different relative display location on each attendee's own screen).

Thus, in one specific example implementation, the presenter does not necessarily have to even share their screen via the video conference as present principles may be employed with or without a presenter screen share. In any case, the presenter might annotate something on their own screen by, for example, drawing a circle around something, drawing an arrow pointing at something, underlining something, etc. Computer vision technologies may be employed to determine what is being highlighted, circled, pointed at, etc. As much information as possible may then be gathered through computer vision (including identifying characteristics of the object to which the annotation is directed such as text, shapes, colors, etc.) to help identify the annotated item at the viewer's own screen. The identifying information may then be sent to attendees of the video conference. Then on an attendee's device, computer vision technologies may be used to locate the closest possible match on the attendee's screen. The original annotation from the presenter may then be repeated over the top of the discovered (matched) element on the attendee's screen.

Furthermore, in certain specific examples where a presenter's screen is in fact being shared, one of the viewers/attendees may also annotate on the presenter's shared screen according to the layout of that screen, and that viewer's annotations in reference to a given object on the presenter's screen may then also be reflected on other viewers' screens according to their own respective layouts using similar computer vision principles. Thus, wherever the matching object is located on each individual viewer's screens, one viewer's marking of the object on the presenter's shared screen may also be presented/repeated over top of the matched object on that individual viewer's screen just as if the presenter has made the initial marking themselves on the shared screen.

In various implementations, a client device might determine what user input shapes or identifiers are allowed (circles, arrows, underlines, etc.) for mimicking at an attendee's screen (and thus which ones are not, such as a random, unintentional touch input or a line drawn on a background portion of a presenter's desktop).

Also in various implementations, if a match is not found on an attendee screen, that attendee may be notified that the item was not found. Instructions might even be given to guide the attendee into helping the device locate the item.

Further, in certain implementations, if two or more close matches are found, each match could be highlighted on the screen to help guide the attendee into figuring out which one is the right one.

As an example use case, suppose a grandson (the presenter per this example) is video conferencing with his grandmother. The grandmother might not be sure how to start her web browser and do a Google search for "sewing". The grandson may video call her and, during the conference, use annotations to circle a browser icon on his own screen as located on his desktop layout in the top left corner of his display. At the same time, the grandson might say "Grandma, click here". Computer vision may then be used to determine that the grandson circled the browser icon (e.g., based on the image and colors/color positions contained within the icon itself). This identifying information may then be sent to the grandmother's own device so the grandmother's device can locate a close match in the toolbar at the bottom of her screen. The grandmother's device may then present a graphical representation of the grandson's circling but around the grandmother's own browser icon so that she may click the icon. Next, the grandson might say "type the word 'sewing' here" and draw an arrow that points to the browser's search bar in the browser that just opened on his computer screen. Computer vision at the grandson's device may note that the arrow is pointing to a rectangular field with circular edges that contains the text "Search or type a URL". This identifying information may also be sent to the grandmother so that the grandmother's device can locate an exact match in the browser that she opened. The grandmother's device may then reproduce the arrow on her own screen, with the arrow pointing to the search field. The grandmother has now been guided as to how to do the search, even though her browser icon was in a different spot on her desktop and her browser window was a different size/in a different position than the grandson's.

As another example use case, suppose three hundred employees of a given company are attending a webinar to learn how to use a new feature in a software application ("app"). The webinar may have all communication features disabled for the attendees such that they cannot use audio to ask questions nor text chat and instead the attendees can only listen to the instructor. To avoid situations where the instructor speaks and takes certain actions so fast that the attendees are left behind, every attendee may log into the software app on their own system. The instructor may circle a given icon in the top left of their screen. The instructor's computer notes that the icon has a purple rectangle containing white letters that spell a certain name. Some attendees might have their browsers open maximized, others might have them in a window, and each attendee using a window may have their browser in different relative display positions on their own display screens. Notwithstanding, each attendee's device may execute computer view to render the instructor's circle around the matching icon on their own screen wherever it might appear so they know exactly what to click. The instructor might then draw an arrow pointing toward another icon presented in response to selection of the prior icon. Computer vision may be used to note that black letters spelling a name for this second icon may exist near the instructor's arrow, and that the second icon has a small white circle contained by a larger dark blue circle which itself is contained by a light blue circle. The same element may then be located on each attendee's own screen and the annotated arrow may appear pointing toward the matched icon on the attendee's own screen to show each attendee what to click. Thus, every attendee was helped on their own computer without having to interrupt the webinar even though everyone might have had a slightly different setup.

Now suppose that an attendee arrived late, or that an attendee needed more time to complete a task but the presenter has already moved on to a new annotation, or that an attendee wants to watch a video recording of the presentation after it has finished but picks up in the middle of the video. In this case, the attendee might be unable to follow through or even know what has been shared before. Thus, present principles may be used to create an annotation event stream that can be shared during or after the session itself.

For example, the presenter may start a session and circle the Microsoft Word icon on their own screen. A new event may be created by the presenter's device and contain the description of the annotation (as determined using computer vision technology) as well as additional metrics such as timing of the annotation, tooltips explaining what is being annotated or what action to perform on it, etc. Attendees can then subscribe to this event stream at any time and be able to view previous events in a sequential manner even if the presenter has moved on to latter actions. Thus, if an attendee arrived late, they could view the annotation event stream in a delayed fashion and catch up. If an attendee replays the video and events at a later time after the recording of the original video has ended, they can have the annotations applied to their own screen at that time as well.

Thus, in some specific example implementations, the presenter may start a live session/livestream. The presenter may annotate something on their screen and then as much information as possible may be gathered by the presenter's device using computer vision (e.g., identifying text, shapes, colors, etc.) to help identify the annotated item on other people's own screens. The identifying information with additional attributes may be saved in a form of an event and be distributed to the attendees who have been added to the session. Additional metadata may also be gathered, such as a set of instructions that should be performed on the annotated item as spoken by the presenter and recognized via voice recognition/speech-to-text and natural language understanding. If an attendee arrives late, the annotation stream can play from the beginning to help them catch up. If an attendee watches the event after it has ended, the annotations can appear during the replay on the attendee's screen. Moreover, if an annotation is not possible due to a missing element on the attendee's screen, the event stream can pause until the user intervenes so that the element is presented. For example, the Microsoft Word icon might be buried in a menu that is not visible for computer vision and so, on an attendee screen, the annotation event stream pauses because it cannot locate the icon. The attendee may then click on a menu to have the icon appear and then the annotation event stream can continue now that the icon is visible.

As an example use case, suppose a person named Matt is leading a class on how to use a spreadsheet app. He demonstrates to the class how to launch the spreadsheet app by circling the spreadsheet app's icon on his own screen and then points to and clicks on the File menu, circles and clicks the Open option, and then opens a sample spreadsheet. Also suppose that an attendee named Leana arrives five minutes late to the meeting and has never used the spreadsheet app before. As soon as she arrives, an annotation appears around her own spreadsheet icon asking her to click it. She clicks it, and then an annotation appears on her own screen that points to the File menu asking her to click it. She does that, and then an annotation appears showing her to click Open and then follow other steps Matt set forth. Leana is able to quickly catch up on the presentation even though she missed the first five minutes and thus does not have to interrupt Matt as he continues to present.

As another example use case, suppose a person named Lindsay is an instructor at a local high school. The class is using school-supplied laptops for a lesson. Each person in the class opens their online math book and Lindsay asks everyone to click a button in the software that allows them to solve math problems in the online book (e.g., in edit mode). Also suppose a student named Tim missed this class, and two days later he decides to catch up by watching the recording/replay of the class. After hearing the instructions, Tim opens his online math book on his own laptop. An annotation may then immediately appear showing him that he needs to click the edit button in order to be able to work on his math problems as the class did two days earlier.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C#or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a camera 191 that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. The system 100 may include an audio receiver/microphone 193 that provides input from the microphone to the processor 122 based on audio that is detected, such as via a user providing audible input to the microphone. Thus, in various examples consistent with present principles, a presenter/conferencing video with an audio component may be generated using the camera 191 and microphone 193. In other examples, video without an audio component may be generated by the camera. In either case, the video may be used as described further below.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122.

Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
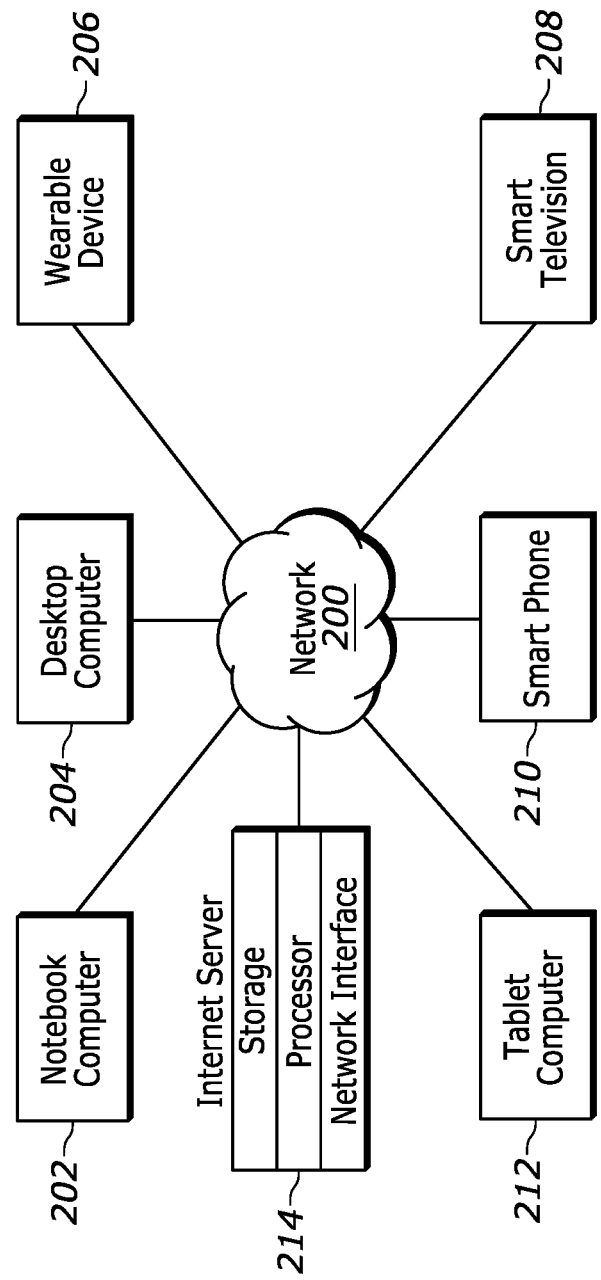
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
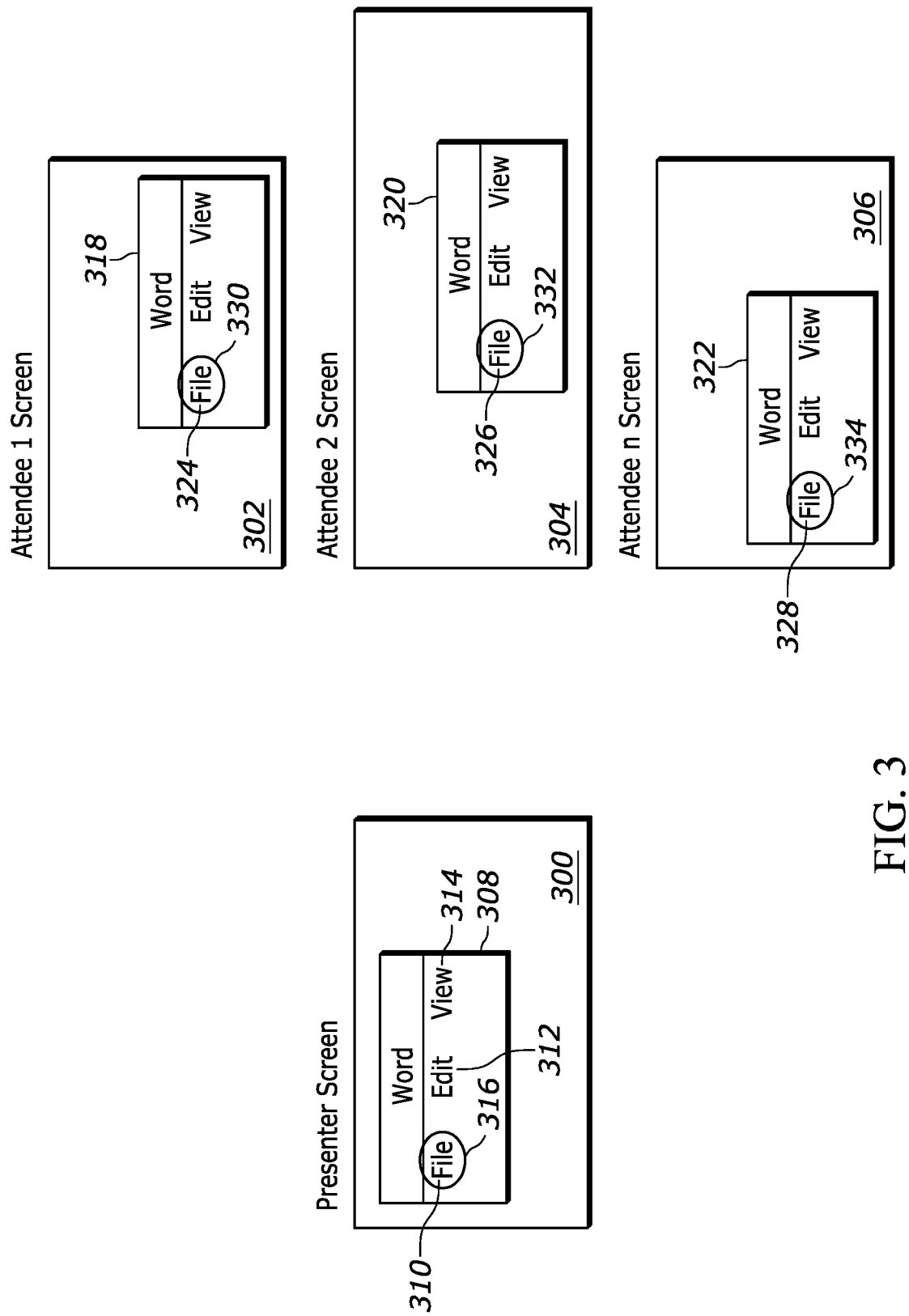
FIG. 3 is an example schematic diagram of different display screens of a presenter and attendees of a video conference to demonstrate how a presenter's user input might be reproduced at each attendee's screen.

Now in reference to FIG. 3, example display screens 300-306 are shown that may be presented on the respective displays of respective client devices being used for video conferencing. The client devices might be laptop computers, smartphones, headsets like smart glasses, etc.

As shown in FIG. 3, the first display screen 300 reflects the current display screen of a presenter of the video conference. As such, the screen 300 shows a word processor application window 308 that has a file selector 310, edit selector 312, and view selector 314. FIG. 3 also shows that the presenting end-user has positioned (hovered) a circular cursor 316 over top of the file selector 310 using a mouse or other input device, which this user might have done while speaking about selecting the selector 310 as part of the video conference itself.

Consistent with present principles, the presenting end-user's client device may execute computer vision locally at that client device to determine identifying information for the selector to which the user input was directed (the selector 310). For example, the client device may execute optical character recognition specifically to determine text indicated on the selector (in this case, "file"). The client device may also execute other computer vision algorithms such as feature extraction, object recognition, and image understanding to determine visually-distinguishing characteristics of the selector being selected via the hover gesture, such as the color(s) of the selector, the shape and style(s) of the selector, and particular unique images forming part of the selector (e.g., a specific software application's logo). However, also note that in addition to or in lieu of executing these functions locally at the presenter's client device itself, that client device may stream a video stream of the screen 300 to a remotely-located server like a server coordinating the video conference amongst the client devices for the server to then execute these functions.

In any case, as further shown in FIG. 3, each attendee's own respective screen 302-306 may depict the presenter's user input via their own displays and graphical elements. This might be done by each attendee's own respective client device (and/or coordinating server) executing computer vision on that attendee's respective display screen 302-306 feed to, using the identifying information and user input information sourced from the presenter's device, identify one or more graphical objects on the attendee's display screen that matches the selected graphical object from the presenter's display screen 300 to a threshold level of confidence. Once identified, a visual representation of the presenter's user input may be used to visually demonstrate the user input itself via the matched graphical object(s) on the attendee's own display screen. This may be done with or without presenting, at each attendee's screen 302-306, a video stream of the presenter's own screen 300 as might be shared with the attendees since the attendee need not necessarily view the presenter's stream and can instead use the respective matched graphical object from their own display screen to provide the same or similar user input as the presenter (but to the matched graphical object on their own display screen to follow along with the presenter).

The right-hand side of FIG. 3 thus shows a respective word processing application ("app") window 318-322 that is generated at each respective attendee's own client device using a respective version (same or different) of a same word processing software app that is stored and executed locally at each attendee's own client device. Since a respective matching selector 324-328 (possibly for a window 318-322 determined to itself match to the window 308) has been identified at each respective screen 302-306 using computer vision, a reproduction of the presenter's user input may be presented at each respective screen 302-306 by either or both of controlling the attendee device's own respective mouse cursor 330-334 to hover over the respective selector 324-328 or overlaying an image of the presenter's own mouse cursor over top of the respective selector 324-328 (e.g., as generated from the user input information sourced from the presenter's device itself).

Note that each attendee client device may present the respective mouse cursor 330-334 (and/or cursor image) even if the presenter's graphical object and matched attendee graphical object are presented at different relative display locations owing to the graphical objects from the presenter and attendee device screens being matched via computer vision regardless of different relative display locations. As an example, note that the window 308 on the presenter's screen 300 (and hence object 310) is in the upper left area of the screen 300. But further note that the matched object 324 is presented at the lower right area on the screen 302, the matched object 326 is presented in a lower middle area of the screen 304, and the matched object 328 is presented on a lower left area of the screen 306.

Figure 4:
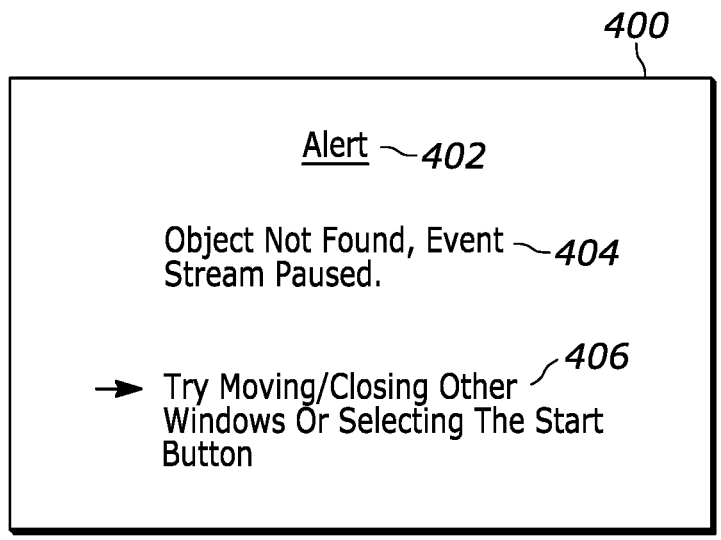
FIG. 4 is an example graphical user interface (GUI) that may be presented when a given graphical object cannot be located via computer vision on an attendee's screen.

Now in reference to FIG. 4, suppose a respective attendee has their respective window 318-322 closed or minimized when their client device executes computer vision to attempt to locate the matching graphical object. The graphical user interface (GUI) 400 of FIG. 4 may be presented responsive to that attendee's client device not being able to identify the matching graphical object since the attendee will not be able to perform user input similar to that of the presenter.

Accordingly, as shown in FIG. 4, the GUI 400 may include a prompt 402 along with a text indication 404 that a matching graphical object was not found on the respective attendee's screen and that, as such, the attendee's event stream has been paused. The event stream itself may indicate a sequence of presenter user inputs to reproduce at the attendee's device and, as such, may include respective identifying information and user input information for each respective user input/presenter action taken at the presenter's own device (e.g., cursor hover over app icon, then app launch, then drawing of an arrow pointing toward a given graphical object presented in the app, etc.).

As also shown in FIG. 4, the GUI 400 may include instructions 406 to help guide the attendee to render a matching graphical element on their own display. Accordingly, in the present example the instructions 406 indicate that the attendee can try moving or closing any other windows that are currently presented on their client device's display or possibly even selecting the start button on their desktop layout. Other example instructions might be to select a drop-down menu using a file selector or to select an item from the desktop's toolbar. Then once a matching graphical object is ultimately presented, the presenter's user input may be depicted at the attendee's own client device via the matched graphical object consistent with present principles.

Figure 5:
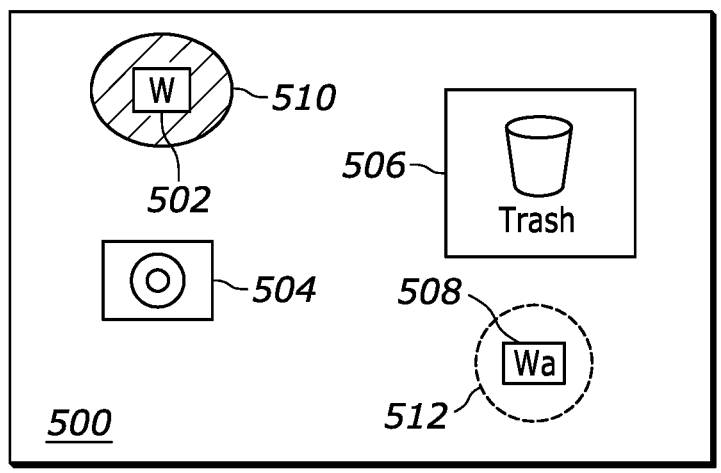
FIG. 5 shows an example GUI that may be presented when multiple potentially matching graphical objects have been located via computer vision on an attendee's screen.

Now in reference to FIG. 5 and as another example, suppose an attendee's client device executes computer vision with the resulting output being that two or more graphical objects presented on the attendee's screen match the presenter's graphical object to within a threshold level of confidence. Here, each graphical object matching to the threshold level of confidence may be highlighted to the user. FIG. 5 thus shows, using a desktop screen 500 with app icons 502-508 as an example, that a first matching graphical object 502 that is matched with a higher level of confidence than a second matching graphical object 508 may have a circular cursor 510 positioned over top of it just as the presenter's own circular cursor is presented over top of a corresponding graphical object on the presenter's own screen.

FIG. 5 also shows that the second matching graphical object 508 may have its own depiction of a circular cursor 512, but that is less pronounced. Specifically, the cursor 512 may be rendered using alpha blending to have a transparent interior and perforated perimeter yet still be shown as hovering over the object 508. This is in contrast to the presentation of the cursor 510, which is rendered with opaque interior and solid perimeter along with being rendered in a same color as the presenter's own cursor so that the appearance of the cursor 510 matches the appearance of the presenter's own cursor as presented on the presenter's screen. Thus, the attendee's attention may be drawn to both of the objects 502, 508 to select the appropriate one, with the respective object in which the attendee's client device has a higher confidence level in being a match being highlighted in a more pronounced fashion.

Figure 6:
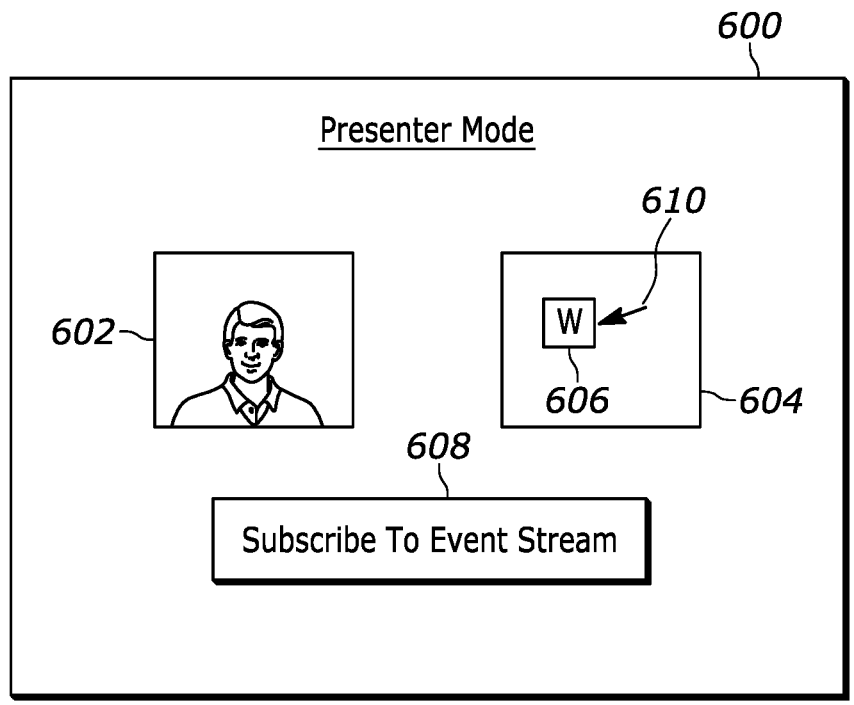
FIGS. 6-8 show various example GUIs that may be used to subscribe to an event stream and catch up to where a presenter is at currently in a user input sequence.
Figure 7:
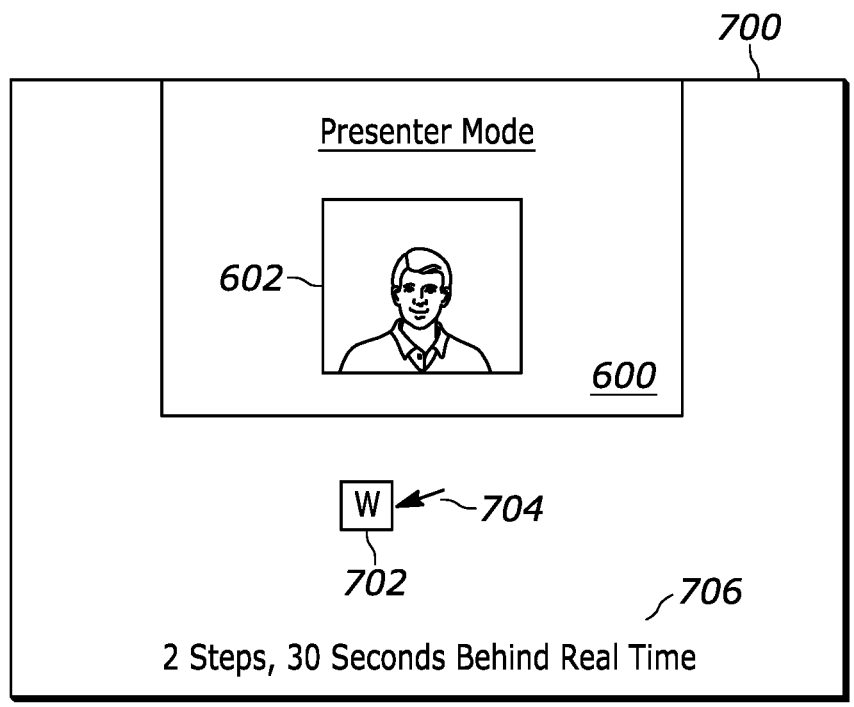
Figure 8:
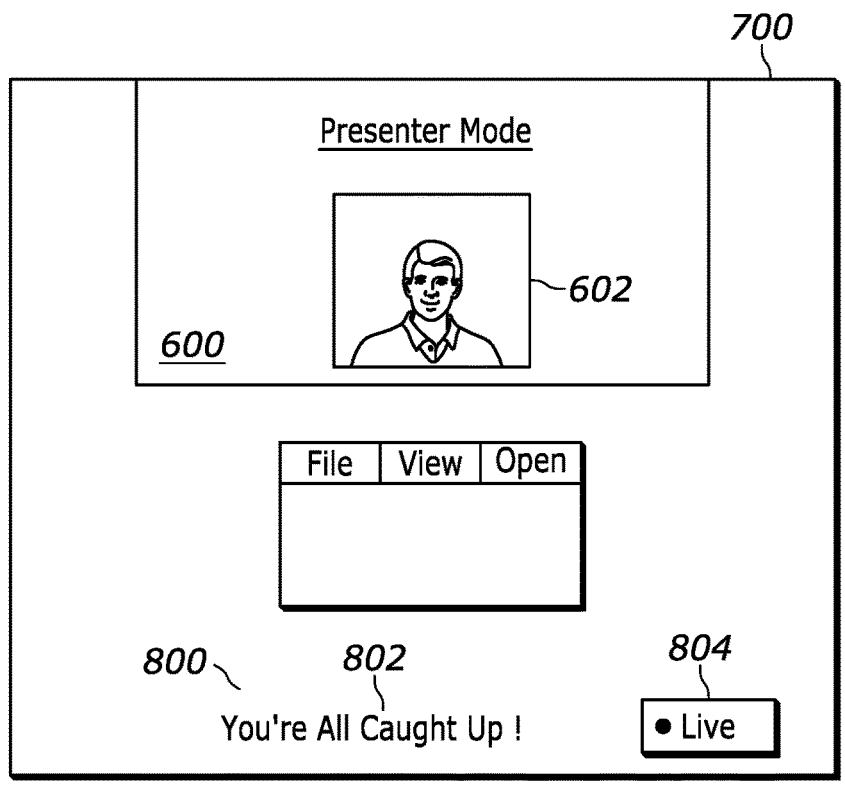

Continuing the detailed description in reference to FIGS. 6-8, suppose an end-user wants to watch a livestream of a currently-transpiring video conference or even watch a recorded video/video conference from the past. The video may be presented as part of a GUI 600, and therefore the GUI 600 may include a video stream 602 of the presenter's head as the presenter speaks as well as another video stream 604 of the presenter's screen as the presenter both shares it and directs user input to it to select a first graphical object 606 consistent with present principles. While a dual feed format is shown, in other examples a split screen format, picture-in-picture format, or other format might be used to present the two different streams.

Then, should the viewer wish to follow the presenter's user inputs by performing similar user inputs at their own respective client device in the same sequence as the presenter, the viewer may select selector 608 to subscribe to the video's event stream. This in turn may command the conferencing software (or other type of software) executing at the viewer's device to begin depicting the presenter's user input(s) but at a matching graphical object 702 presented on the viewer's own display as shown in FIG. 7. As also shown in FIG. 7, the GUI 600 has been reduced in size (with the video stream 604 and selector 608 being removed) responsive to selection of the selector 608 so that the viewer's client device may visually indicate a matching graphical object 702 on the client device's own desktop screen 700.

FIG. 7 also shows that the presenter's annotation of a hand-drawn arrow 610 as shown in FIG. 6 has been reproduced on the viewer's own client device display as arrow 704. Further note that the viewer's client device may use the user input information from the event stream to scale the arrow 704 as presented on their own display so that when presented the arrow 704 appears at a same proportional size relative to the graphical object 702 as the size of the arrow 610 relative to the graphical object 606 as presented at the presenter's own display.

FIG. 7 also reflects that there may be instances where the viewer does not progress through similar user inputs as the presenter in real time as the corresponding video 602 is played out. For example, the presenter might select an app icon from their desktop to launch a corresponding app, then select the file selector from a window of the app that is presented, and then select another selector from the resulting drop-down list in quick succession. The video 602 showing the presenter speaking and providing these inputs may be presented at real time speed and uninterrupted (unless the viewer manually pauses it), but the event stream itself may be paused to wait for the viewer to perform each similar user input in the same sequence but at the viewer's own pace. Thus, the video conferencing software or event stream algorithm may track the viewer's own inputs to their own client device to determine when the viewer provides a given user input matching a corresponding presenter input from the presenter's own user input sequence (indicated in the event stream) before depicting a subsequent user input of the presenter at the viewer's own client device for mimicking.

As further shown in FIG. 7, the screen 700 may even include an indication 706 indicating how far behind the viewer is compared to the presenter's own user input sequence and real-time playout of the video. The indication 706 may therefore indicate how many seconds prior (relative to the current real-time speed playout position of the video 602) the presenter made the same user input at their own device and how many more user input steps the presenter has subsequently taken after that so that the viewer knows how far behind they are in terms of event sequence relative to real-time playout of the video 606. Accordingly, in the present example the indication 706 indicates that the viewer is two steps and thirty seconds behind what is currently being shown in the video 602.

Then once the viewer's own event sequence has caught up to real-time playout of the video 602, an indication 800 as shown in FIG. 8 may be presented on the desktop screen 700. As shown, the indication 800 includes text 802 indicating that the viewer has now performed every user input matching the presenter's own user input and is therefore caught up to what the presenter is currently doing or about to do according to the current real-time speed playout of the video 602. As also shown, the indication 800 may include a "live" icon 804 indicating that the event stream playout now matches the video 602 playout. Note here that event stream steps and corresponding video portions showing the presenter providing the corresponding user inputs themselves may each have their own timestamps as created at the presenter's device (e.g., responsive to receipt of the presenter's user inputs themselves) so that the event stream algorithm may track if and how far behind the viewer is in performing corresponding user inputs relative to real time playout of the video 602 via the timestamps.

Figure 9:
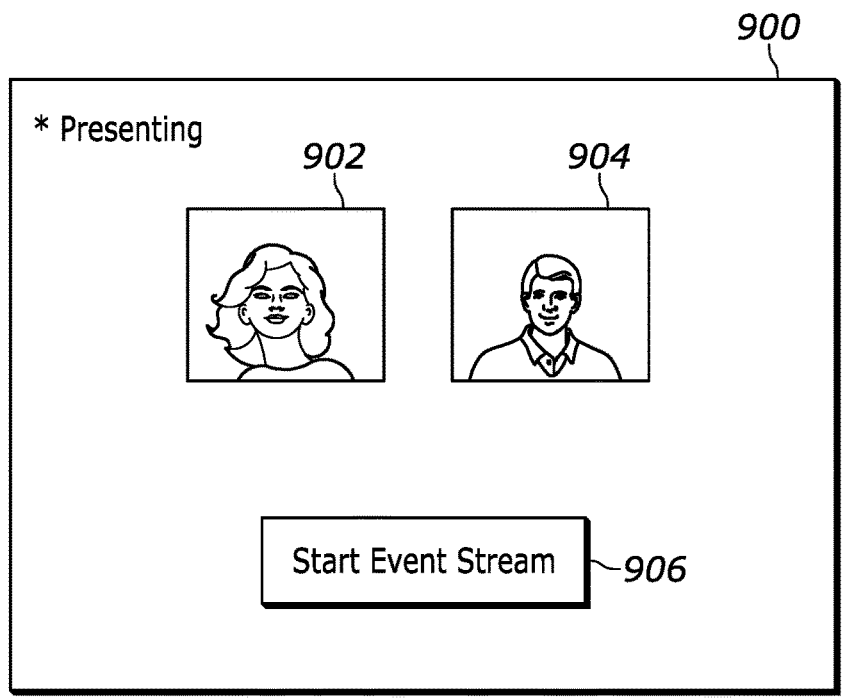
FIG. 9 shows an example GUI that may be presented on a presenter's own screen to start an event stream.

Now in reference to FIG. 9, another example GUI 900 is shown. The GUI 900 may be presented on the display of a presenter device or device of another type of person that is recording a video for viewing by others. In the present example, the person is in fact acting as a presenter of a video conference, with the live video streams 902, 904 of other attendees being presented on the GUI 900. Should the presenter wish to provide user inputs that they wish the attendees themselves to track and possibly perform at their own respective client devices, the presenter may select the selector 906 to initiate an event stream. For example, selection of the selector 906 may command the video conferencing software or event stream algorithm executing at the presenter's device to begin tracking user inputs that the presenter makes and execute computer vision to determine identifying information for the graphical object(s) to which those user inputs are directed. The presenter's device may also begin generating identifying information for those graphical objects as well as user input information regarding the character of the user input itself for inclusion of both of those types of data in the event stream itself.

Figure 10:
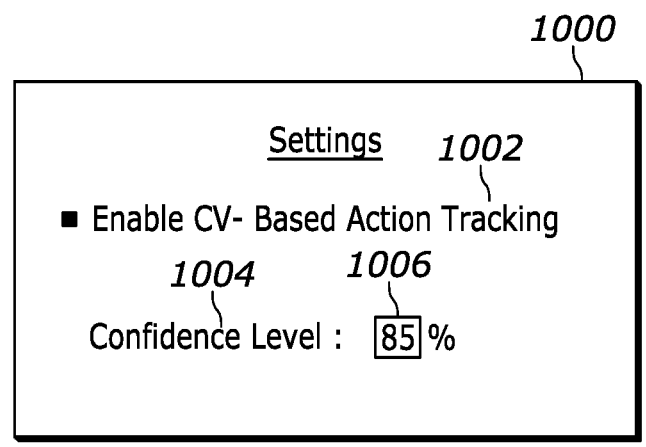
FIG. 10 shows an example settings GUI that may be presented to configure one or more settings of a device to operate consistent with present principles.

Continuing the detailed description in reference to FIG. 10, it shows an example settings GUI 1000 that may be presented to configure one or more settings of a device to undertake present principles. For example, the GUI 1000 may be presented by navigating a device or app menu at a client device that generates an event stream or one that receives an event stream.

Accordingly, as shown in FIG. 10 the GUI 1000 may include a first option 1002 that may be selectable a single time via touch or cursor input to configure the device to generate and/or present event streams for multiple future video conferences or video recordings consistent with present principles. Thus, selection of the option 1002 may configure the device to execute the logic of FIGS. 11 and/or 12 as will be described shortly, as well as to take one or more of the actions described above in reference to FIGS. 3-9.

In some examples, the GUI 1000 may even include a setting 1004 at which the end-user may establish a particular threshold level of confidence to use for determining that a graphical object annotated by or otherwise selected by the video provider (e.g., video conference presenter) matches another graphical object presented on the separate display of a viewer of the video. In the present example, the threshold level may be set by directing numerical input to input box 1006, and here the end-user has established the threshold level at eighty five percent.

Figure 11:
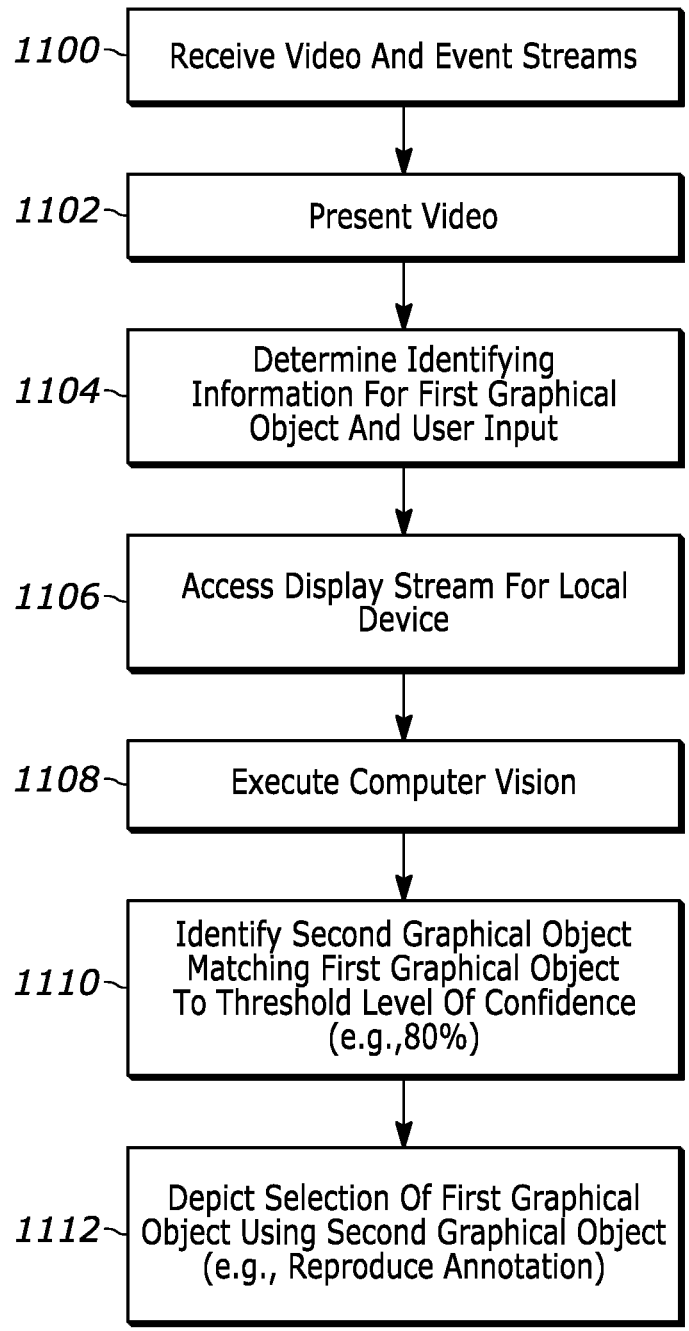
FIG. 11 illustrates example attendee device logic in example flow chart format that may be executed consistent with present principles.

Now in reference to FIG. 11, it shows example logic consistent with present principles that may be executed by a device such as the system 100, a first client device at which a video and corresponding event stream will be viewed, and/or a coordinating server in any appropriate combination. Note that while the logic of FIG. 11 is shown in flow chart format, other suitable logic may also be used.

Beginning at block 1100, the first device may receive discrete video and event streams and, at block 1102, present the video itself at the first device. The video may be generated at a second device different from the first device, such as the client device of a video conference presenter or whomever is recording a video for viewing after the fact. Also note that the video received at block 1100 and presented at block 1102 may be video showing the presenter themselves as they speak and/or a video screen share of the presenter's screen as the presenter provides user inputs to graphical objects on their screen. Further note that the video and event streams may be received directly from the second device in a peer-to-peer networked environment, but may additionally or alternatively be received from a coordinating server that routes video streams and event streams between the client devices. Also remember again that the event stream itself may include both the identifying information for a selected graphical object as well as user input information indicating the particular user input used to select that graphical object.

From block 1102 the logic may then proceed to block 1104. At block 1104 the first device may determine identifying information for a first graphical object actually selected at the second device, where the first graphical object is related to the video in that, for example, the video shows the first graphical object being selected via a screen share and/or the video shows the person themselves providing the user input to select the first graphical object. Note here that while the identifying information may be determined from the received event stream itself, in some examples the first device may additionally or alternatively generate its own event stream via a received video screen share from the presenter's device (e.g., using computer vision and other aspects discussed above using).

From block 1104 the logic may then move to block 1106. At block 1106 the first device may access a livestream of the first device's own local display (e.g., all content currently presented on the display) to, at block 1108, execute computer vision using the livestream. For example, at block 1106 the first device may access or otherwise use the display rendering data that its central processing unit provides to the display's driver for rendering of the screen on the display itself. Thus, based on the identifying information and rendering data, the first device may execute computer vision to identify a second graphical object from the viewer's own screen at block 1110 that matches the first graphical object to at least a threshold level of confidence (eighty percent in this example).

Thereafter, the logic may proceed to block 1112. At block 1112 the first device may based on the identification of the second graphical object to the threshold level of confidence, depict, on the first device's own display via the second graphical object itself, the selection at the second device of the first graphical object. Thus, the first device may reproduce an arrow, a hand-written textual note, a circling, an underlining, or another type of annotation that was hand-drawn or hand-written to the display of the second device itself (e.g., using a stylus or finger or mouse cursor) and directed toward the first graphical object to select it, but as similarly pointing/directed toward the matching second graphical object of the viewer device instead. Mouse click selections on a certain graphical object may be similarly reproduced by visually mimicking the mouse click on the first graphical object but on the second graphical object.

Figure 12:
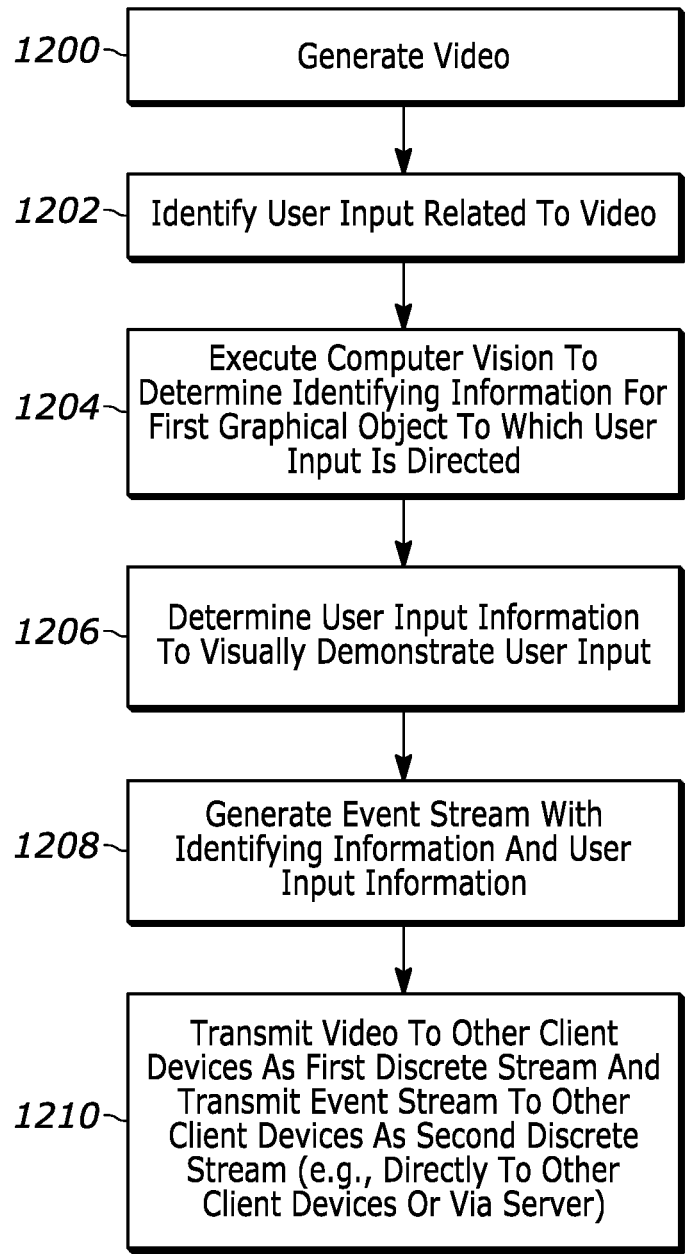
FIG. 12 illustrates example presenter device logic in example flow chart format that may be executed consistent with present principles.

Continuing the detailed description in reference to FIG. 12, it shows example logic consistent with present principles that may be executed by a device such as the system 100, a second client device transmitting a video and corresponding event stream to the first device of FIG. 11, and/or a coordinating server in any appropriate combination. Note that while the logic of FIG. 12 is shown in flow chart format, other suitable logic may also be used.

Beginning at block 1200, the second device may generate video as part of a recording, video conference, livestream, etc. The video may include red green blue (RGB) images from a digital camera imaging the presenter's face, and/or RGB images of content that is currently-presented on the second device's display (e.g., a real time feed of all opened and non-minimized windows and other content as currently presented on the second device's display itself).

From block 1200 the logic may then proceed to block 1202. At block 1202 the second device may identify, while the video is being generated, user input to the second device. The user input may be related to the video in that the video may show the presenter via a digital camera while the presenter provides the user input, and/or in that the video may show the content currently presented on the second device's own display as the viewer provides the user input to annotate or otherwise select the content (e.g., move the content around the display, mouse-click certain portions of the content, etc.).

Thereafter the logic may proceed to block 1204. At block 1204 the second device may execute computer vision to determine identifying information for a first graphical object that is presented on the second device's display and to which the user input is directed. The logic may then proceed to block 1206 where the second device may determine user input information that is usable to visually demonstrate the user input itself on displays of the second device and other devices, such as the shape of the user input, relative size of the user input, relative position of the user input in relation to the first graphical object itself, etc.

From block 1208 the logic may then proceed to block 1210. At block 1210 the second device may transmit the video, the identifying information, and the user input information to one or more other devices different from the second device, such as transmitting those items to the first device of FIG. 11. In some specific examples, at block 1210 the second device may generate the event stream indicating the identifying information and the user input information, and then transmit the video to the first device as a first discrete stream and transmit the event stream to the first device as a second discrete stream that is different from the first discrete stream. Again note that these streams may be transmitted peer-to-peer to the first device and/or may be routed through a coordinating server.

It may now be appreciated that present principles provide for an improved computer-based user interface that increases the functionality and ease of use of the devices disclosed herein as well as providing certain cross-compatibility between devices with different operating systems, layouts, etc. The disclosed concepts are therefore rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   analyze video generated at a second device different from the first device;
   determine, from the analysis of the video, identifying information for a first graphical object selected at the second device;
   based on the identifying information, execute computer vision to identify a second graphical object that matches the first graphical object to at least a threshold level of confidence, the second graphical object presented on a display of the first device in real time as the first graphical object is presented on a display of the second device; and
   based on identification of the second graphical object and without presenting a screen share from the second device, depict, on the display of the first device, the selection at the second device of the first graphical object by indicating the second graphical object for selection at the first device.

2. The first device of claim 1, wherein the first and second graphical objects are respectively presented at different relative display locations at the second and first devices.

3. The first device of claim 1, wherein the first and second graphical objects are selectors that are associated with different respective software application versions.

4. The first device of claim 1, wherein the first and second graphical objects comprise text respectively presented at the second and first devices.

5. The first device of claim 1, comprising the display of the first device.

6. The first device of claim 1, wherein the instructions are executable to:
   indicate the second graphical object for selection at the first device by moving a first cursor of the first device over the second graphical object, the first cursor being different from a second cursor of the second device that is used to select the first graphical object at the second device.

7. The first device of claim 1, wherein the instructions are executable to:
   indicate the second graphical object for selection at the first device by moving a first cursor of the first device over the second graphical object, the first cursor being different from an image of a second cursor of the second device as shown in the video.

8. The first device of claim 1, wherein the instructions are executable to:

indicate the second graphical object for selection at the first device according to a different operating system and screen layout of the first device compared to the second device.

9. The first device of claim 1, wherein the instructions are executable to:
based on being unable to identify any graphical object currently presented at the first device that matches the first graphical object to within the threshold level of confidence, present a prompt at the first device for a user to take one or more actions at the first device to present the second graphical object at the first device.

10. A method, comprising:
determining, at a first device, identifying information for a first graphical object selected at a second device different from the first device;
based on the identifying information, using computer vision to identify a second graphical object that matches the first graphical object to at least a threshold level of confidence, the second graphical object presented on a display of the first device; and
based on identifying the second graphical object using computer vision and without presenting a screen share from the second device, depicting, on the display of the first device, the selection at the second device of the first graphical object.

11. The method of claim 10, wherein the depicting of the selection of the first graphical object comprises reproducing, on the display of the first device, an annotation made at the second device in relation to the first graphical object, the annotation comprising one or more of: a circling of the first graphical object, an underlining of the first graphical object, a drawing of an arrow pointing toward the first graphical object.

12. The method of claim 10, wherein the first and second graphical objects are icons respectively presented at different relative display locations at the second and first devices.

13. The method of claim 10, wherein the depicting of the selection of the first graphical object comprises depicting a mouse click on the second graphical object.

14. The method of claim 10, comprising:
indicating the second graphical object for selection at the first device by moving a first cursor of the first device over the second graphical object, the first cursor being different from a second cursor of the second device that is used to select the first graphical object at the second device.

15. The method of claim 10, comprising:
indicating the second graphical object for selection at the first device by moving a first cursor of the first device over the second graphical object, the first cursor being different from an image of a second cursor of the second device as shown in the video.

16. The method of claim 10, comprising:
indicating the second graphical object for selection at the first device according to a different operating system and screen layout of the first device compared to the second device.

17. At least one computer readable storage medium (CRSM) that is not a transitory signal, the at least one CRSM comprising instructions executable by at least one processor to:
execute computer vision on video from a first device to determine identifying information for a first graphical object that is presented at the first device and to which user input to select the first graphical object is directed;
use the identifying information to identify a second graphical object presented at a second device as matching the first graphical object to within a threshold level of confidence; and
based on the identification of the second graphical object and independent of spatial relationship to the video from the first device as presentable at the second device, present, at the second device, an indication to select the second graphical object.

18. The at least one CRSM of claim 17, wherein the instructions are executable to:
indicate the second graphical object for selection by moving a first cursor of the second device over the second graphical object, the first cursor being different from a second cursor of the first device as used to provide the user input.

19. The at least one CRSM of claim 17, wherein the instructions are executable to:
indicate the second graphical object for selection by moving a first cursor of the second device over the second graphical object, the first cursor being different from an image of a second cursor of the first device as used to provide the user input.

20. The at least one CRSM of claim 17, wherein the instructions are executable to:
indicate the second graphical object for selection according to a different operating system and screen layout of the second device compared to the first device.

* * * * *